Jan. 4, 1938.  J. D. LEWIS  2,104,130
TANK HOLDING CAGE
Filed Nov. 25, 1936
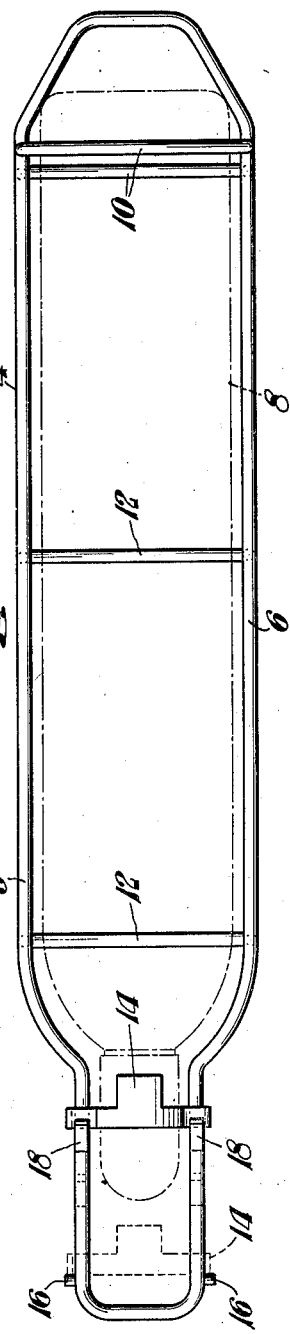
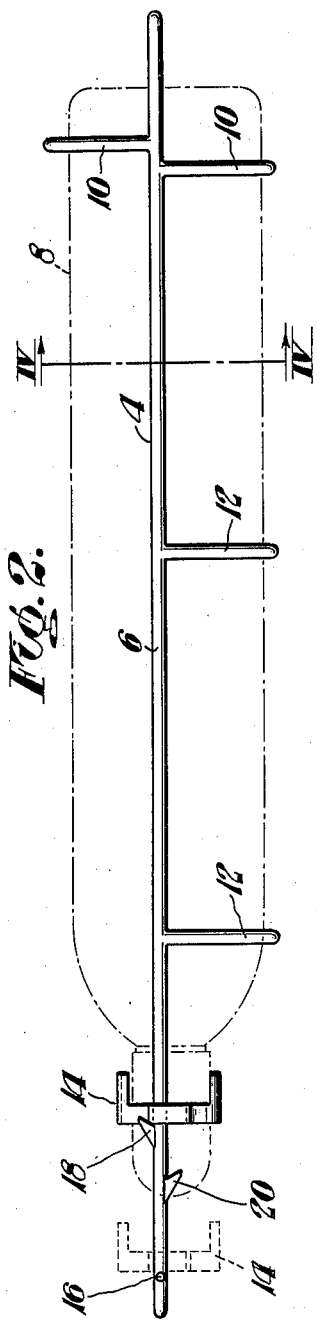
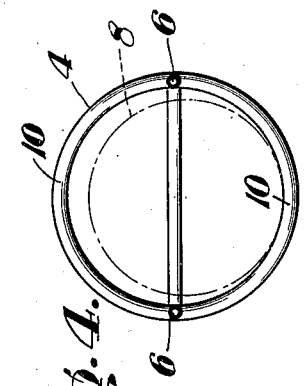
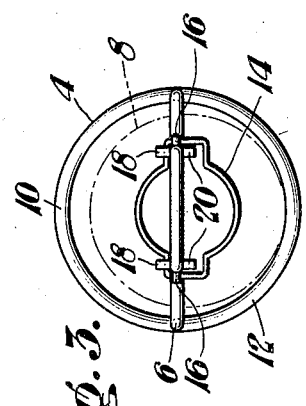
Inventor:
JOHN D. LEWIS,
by: Usina & Rauber
his Attorneys.

Patented Jan. 4, 1938

2,104,130

UNITED STATES PATENT OFFICE 2,104,130

TANK HOLDING CAGE

John D. Lewis, Youngstown, Ohio

Application November 25, 1936, Serial No. 112,791

2 Claims. (Cl. 224—45)

This invention relates to cages that are adapted to carry and retain tanks therein and has for an object the provision of a cage in which tanks can be safely and conveniently transported.

The above and other objects will be made apparent by the following description and by reference to the accompanying drawing, in which:

Figure 1 is a plan of an embodiment of my tank holding cage, a tank being indicated therein;

Figure 2 is an elevation of the tank holding cage of Figure 1;

Figure 3 is an end elevation of Figure 1 taken adjacent the neck portion thereof; and Figure 4 is a transverse sectional elevation on line IV—IV of Figure 2.

Referring more particularly to the accompanying drawing, the numeral 4 indicates generally a cage or cradle adapted to receive tanks. The cage 4 is composed of a frame 6 that longitudinally encircles or outlines a tank 8 having a neck portion which the cage 4 is designed to receive. Tanks adapted to carry compressed oxygen, acetylene, or the like, are particularly difficult and dangerous to handle. The tank 8 represents a standard tank for carrying such substances. The frame 6 preferably is made to extend a slight distance from the ends of the tank 8 but otherwise closely follow the outline of the tank 8. The portions of the frame 6 extending beyond the ends of the tank 8 provide convenient means by which the cage 4 and the tank 8 can be carried.

In order to hold the base of the tank 8 in the frame 6, means, such as semi-circular bands 10, extend laterally from both sides of the frame 6 adjacent the base thereof and are preferably integral therewith. At least one semi-circular band 12, or other similar means, extends laterally from one side of the frame 6 intermediate the ends and preferably is integral therewith for supporting the body of the tank 8 in the frame 6. By placing the band or bands 12 on but one side of the frame 6, the tank 8 is readily positioned in or removed from the frame 6.

The frame 6, which is adapted to carry or support the tank 8, is provided with a locking-ring 14, or other similar means, of metal or other material having sufficient strength to securely retain the tank 8 therein. The locking-ring 14 is preferably slidably carried by the frame 6 at the portion thereof corresponding to the neck portion of the tank 8. The frame 6 is provided with integral stops 16 adapted to retain said locking-ring 14 thereon.

For the most convenient use of the frame 6, the movement of the locking-ring 14 is such that it can be placed in and made to retain a position which permits the tank 8 to be placed in the frame 6 and a second position which secures the tank 8 in the frame 6. To regulate the movement of the locking-ring 14, any suitable means, such as pairs of integral projections 18 and 20, are provided on the neck of the frame 6, as shown in Figure 2 of the drawing. The projections 18 and 20 are so positioned and shaped that the locking-ring 14 can only be moved over each of the projections separately, and when the locking-ring 14 is between the projections 18 and the body of the frame 6, it is adapted to engage the neck of the tank 8 and thereby secure the tank 8 in the cage 4. The locking-ring 14 is made strong enough to hold the tank 8 in the frame 6 when the frame 6 is moved by a crane or other means. The projections 20 are positioned so that when the locking-ring 14 is between them and the stops 16, it does not interfere with the tank 8 in its removal from or placement in the cage 4. The locking-ring 14 is constructed and arranged to slip over the neck of the tank with proper clearance and includes pockets on each side so shaped that said ring will only clear one set of projections 20 when it is moved along said neck, and is of sufficient strength to retain the tank in said cage when it is carried by a crane-hook in a vertical position.

While I have shown and described a specific embodiment of my invention, it will be understood that I do not wish to be limited exactly thereto, since various modifications may be made without departing from the scope of the invention as defined by the following claims.

I claim:

1. A cage for receiving a standard cylindrical tank adapted to carry highly compressed substances and provided with a reduced neck portion, said cage including a frame longitudinally outlining and extending from said tank, an integral semi-circular band on each side of said frame at the base thereof for holding the end of said tank therein, at least one integral semi-circular band spaced from the base of said frame and on one side thereof for supporting said tank in said cage, spaced pairs of projections on said neck portion of said frame and a locking-ring slidable on said neck portion for engaging one pair of said projections to hold said tank within said cage and engaging the other of said projections whereby a tank may be inserted or removed from said cage.

2. A cage for receiving a standard cylindrical tank adapted to carry highly compressed substances and provided with a neck portion, said cage including a frame longitudinally outlining and extending from said tank, a semi-circular band on each side of said frame adjacent the base thereof and integral therewith adapted to hold the end of said tank therein, at least one semi-circular integral band spaced from the base of said frame on one side thereof adapted to support said tank in said cage, spaced pairs of projections on said neck portion of said frame and a locking-ring slidable on said neck portion for engaging one pair of said projections to hold said tank within said cage and engaging the other of said projections whereby a tank may be inserted or removed from said cage, said frame extending beyond the ends of said tank to provide means for carrying said tank.

JOHN D. LEWIS.